Figure 1:
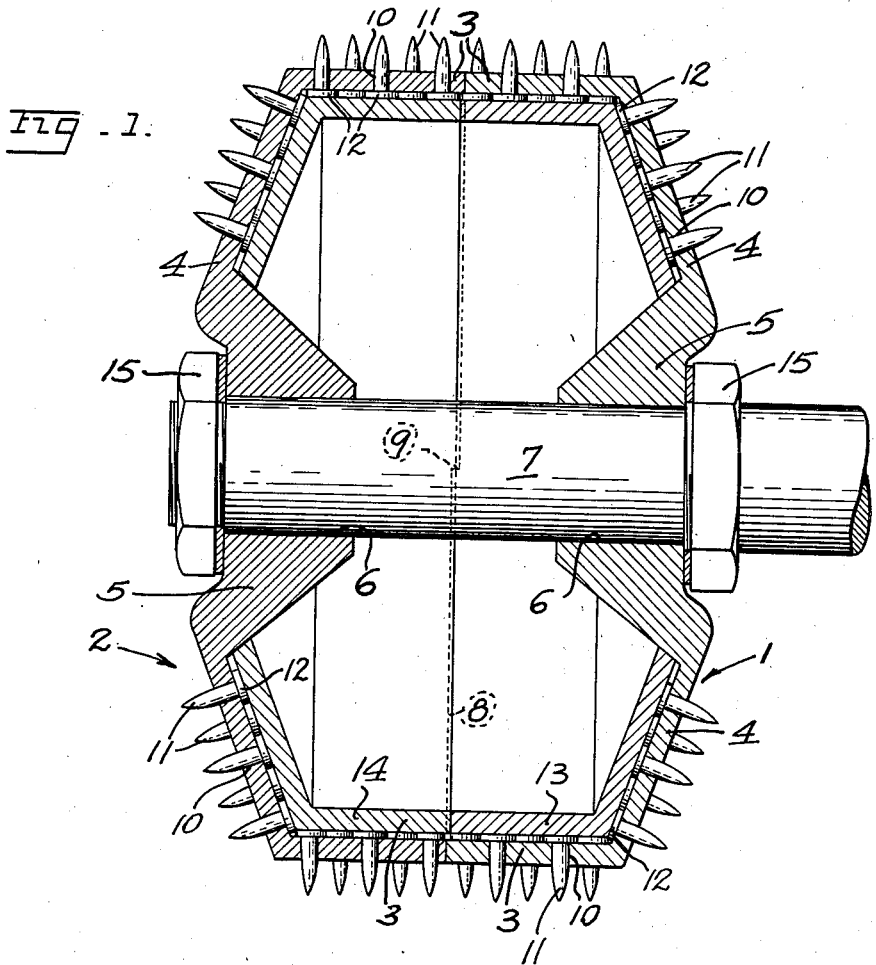

Nov. 3, 1942.  T. P. BACON, JR  2,300,861
RASP
Filed Sept. 6, 1940

INVENTOR.
THOMAS P. BACON, JR.
BY George B. White
ATTORNEY.

Patented Nov. 3, 1942

2,300,861

UNITED STATES PATENT OFFICE 2,300,861

RASP

Thomas P. Bacon, Jr., Oakland, Calif.

Application September 6, 1940, Serial No. 355,557

6 Claims. (Cl. 29—78)

This invention relates to a rasp, and particularly to rotary rasps.

An object of this invention is to provide a rasp for use as a rotary rasp or buffer, and particularly for cutting off or buffing the tread surface of tire casings in preparation for retreading or recapping, the herein rasp being provided, in addition to the substantially cylindrical buffing or rasping surface, with one or more inclined buffing surfaces at such an angle as to permit the cutting or buffing of the side walls of tire casings, especially near the shoulders thereof, when the tire is held in its normal position, and by merely shifting the tire casing to one side relatively to the cylindrical buffing surface of the rasp, thereby obviating the necessity for tilting the tire to various angles during the rasping or buffing operation.

Another object of this invention is to provide a rasp with removable cutting elements, such as staples or tacks, and with means inside the rasp to hold said cutting elements in protruding position, the holder means and the rasping elements being quickly removable and replaceable, and are automatically adjusted in their operative positions by the assembly of the rasp.

Another object of this invention is to provide a rasp member of hollow body sections complementing each other to form a rasp body of suitable shape with cutting surfaces at different angles, and removable cutting elements held on said cutting surfaces by means inside of said hollow body which conform to the angles of the cutting surfaces so as to hold the cutting elements in operative positions, these holding means being located in operative position and held there by the assembled body sections.

Another object of this invention is to provide a rasp which is highly useful and simple in construction. Convenience of arrangement, lightness and comparative inexpense of manufacture are further objects which have been borne in mind in the production and development of the invention.

I am aware that some changes may be made in the general arrangements and combinations of the several devices and parts, as well as in the details of the construction thereof without departing from the scope of the present invention as set forth in the following specification, and as defined in the following claims; hence I do not limit my invention to the exact arrangements and combinations of the said device and parts as described in the said specification, nor do I confine myself to the exact details of the construction of the said parts as illustrated in the accompanying drawing.

Figure 2:
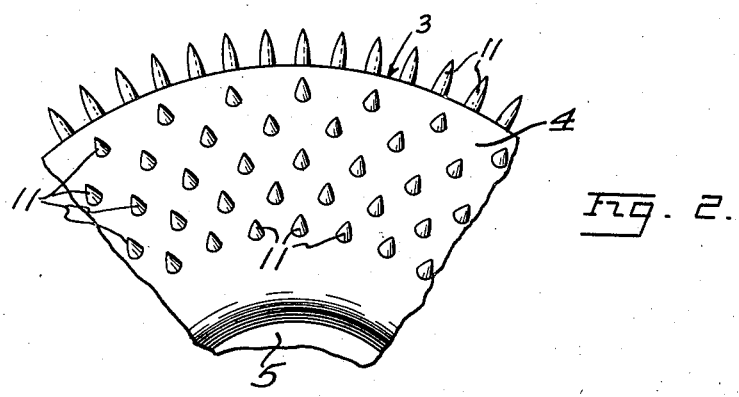

With the foregoing and other objects in view, which will be made manifest in the following detailed description, reference is had to the accompanying drawing for the illustrative embodiment of the invention, wherein:

Fig. 1 is a sectional view of a rasp constructed in accordance with my invention; and Fig. 2 is a fragmental end view of the rasp showing the arrangement of the cutting elements thereon.

In preparing tires for retreading or recapping, a portion of the old worn tread is removed and roughened so as to provide a surface to which the new rubber, such as camelback, readily adheres. This operation is performed either by hand cutting or by a so-called rotary rasp or buffer. Usually such rasp or buffer consists of a rasp body with cutting points or prongs extended from its surface on a cylindrical band around the rasp periphery.

Heretofore in order to cut off or buff the inclined shoulders or side walls of a tire casing, it was necessary to tilt the tire and hold it at an angle against the cylindrical buffing surface. Another difficulty experienced heretofore in connection with rasps, was in the replacement of the worn cutting elements in the rasp.

In its general organization, my invention provides a rasp which, in addition to the cylindrical cutting surface, also provides an inclined substantially frusto-conical cutting surface so that the shoulders or side walls of a tire may be roughened or cut off at a suitable angle by merely shifting the tire to one side relatively to the cylindrical portion of the rasp. Furthermore, the rasp is made of separable sections and with removable tacks or staples which are pressed and held in place by linings inside of said sections, which linings are substantially parallel with the respective cutting surfaces. The arrangement between the linings and the sections is such that when the sections of the rasp are fastened together, the linings therein are backed against each other and are properly located in operative positions by the step of assembling.

In carrying out my invention I make use of a rasp body made of complemental half sections 1 and 2. Each half section is substantially cup-shaped and has a cylindrical wall 3 and a substantially frusto-conical end wall 4. The cylindrical walls 3 of the sections 1 and 2 form each a half of the cylindrical surface of the complete rasp. Each frusto-conical end wall 4 forms an inclined cutting surface of the rasp, projecting outwardly and toward the center of the rasp. In the center of each end wall 4 is formed a hub 5. Through aligned holes 6 in the hubs 5 is placed an arbor or shaft 7, on which the rasp is mounted. In order to prevent relative rotary movement between the rasp sections 1 and 2, the meeting edges 8 of the rasp sections 1 and 2 are cut away to about one-half of the circumference, so that the shoulders 9 at the ends of the cut away edges 8 of the opposed sections abut against each other when the sections are assembled.

Both the cylindrical walls 3 and the frusto-conical end walls 4 are provided with a staggered series of holes 10 through which the cutting elements are extended. In the herein illustration the cutting elements are in the form of slightly tapered tacks 11 made of suitable hard material for roughening or cutting rubber or the like. The tacks 11 are pressed into the holes 10 substantially at right angles to the respective walls 3 and 4. The tacks 11 are inserted in the holes 10 from the inside of the sections 1 or 2, so that the heads 12 of the tacks 11 bear against the inside surfaces of the respective walls 3 and 4 and limit the outward protrusion of the tacks 11. Sectional linings or retaining sleeves 13 and 14 fit into the half sections 1 and 2 respectively so as to press against the heads 12 of the tacks 11 and hold the tacks 11 in cutting position. It is to be noted that each sleeve 13 or 14 has a cylindrical wall and a frusto-conical wall substantially parallel with the corresponding walls 3 and 4 of the rasp section 1 or 2. The dimensions of said retaining sleeves 13 and 14 are such that the free edges thereof meet and are pressed against each other by the half sections 1 and 2 when the rasp is assembled. Thus the pressure exerted upon the half sections 1 and 2 for assembling them, also forces the retaining sleeves 13 and 14 against each other so as to exert an outward pressure on the heads 12 of the tacks 11 in the end walls 3, and to firmly hold all the tacks 11 in proper cutting position. The rasp sections 1 and 2 are held together by suitable lock nuts 15 on the arbor 7 which engage the hubs 5 of the respective sections 1 and 2. The arbor 7 in turn may be suitably connected to a rotating mechanism, not shown, such as a pulley, electric motor, or the like.

It is to be noted that the tacks 11 on the cylindrical cutting surface of the rasp are in staggered rows. The tacks 11 on each frusto-conical end wall 4, are in alternately staggered circular rows, as shown in Fig. 2. This arrangement of the tacks 11 assures even surfaces without furrows or gouges.

In this rasp the tacks 11 are easily replaced with new tacks by removing the sections 1 and 2 from the arbor 7, then removing the retaining sleeves 13 and 14 from the inside of the sections 1 and 2, and then replacing the tacks 11 in the holes 10. After assembling the rasp, the tacks are held in uniformly protruding position. In operation, the crown of the tire can be rasped or buffed by contact with the cylindrical cutting surfaces 3 of the rasp. In order to buff the inclined side wall or shoulder of the tire, it is only necessary to shift the tire casing laterally to one side without any necessity for tilting or holding the tire at angular positions. The incline of the frusto-conical end wall 4 is substantially the same as the usual incline of the side wall of a tire casing near the shoulder of the tire. Thus instead of turning and tilting the tire when it is necessary to clean off the shoulders of the sides of the shoulders of the tire, the tire is merely shifted off the cylindrical rasp surface and then the shoulders are brought in contact with the respective inclined sides of the rasp. In this manner the buffing or cutting of the old tire tread can be efficiently performed at uniform and even inclines as determined by the angular cutting surfaces of the rasp. The handling of the tire during the buffing operation is greatly facilitated because the entire buffing operation, both at the crown and at the sides of the tire tread can be performed in the same relative angular position of the tire casing. The rasp herein described can be easily mounted on the usual mechanisms for driving and rotating such devices, it greatly enhances the ease of operation as well as the facility of replacing the cutting elements or tacks of the rasp.

I claim:

1. In a rasp, a hollow rasp body having a cylindrical surface, substantially frusto-conical end surfaces extended outwardly of the edges of said cylindrical surface, said surfaces having holes therethrough, a plurality of cutting elements held in said holes so as to project outwardly from said surfaces, and means adjacent the inner periphery and in the inner cavity of said rasp body to engage and hold said cutting elements in cutting positions.

2. In a rasp, complemental hollow sections forming the body of the rasp, a plurality of cutting elements removably secured into said hollow sections so as to protrude into cutting position outside the cutting surfaces of said sections, means inside said sections for holding said cutting members in cutting position, and means to hold said sections and said holding means together in assembled position.

3. A rasp comprising a hollow body formed of complemental sections, said body having apertures through the walls thereof, cutting elements extended outwardly through said apertures, means to limit the outward extension of said cutting elements through said apertures, and backing sleeves fitting inside said sections and against the inner ends of said cutting elements so as to hold said cutting elements in extended position, said sleeves being held against each other and in operative position by said sections.

4. A rasp, comprising a hollow rasp body having a substantially cylindrical cutting surface and at least one substantially frusto-conical cutting surface at an angle to said cylindrical cutting surface, a plurality of removable cutting elements extended through said cutting surfaces, and means inside the rasp body to hold said cutting elements in operative positions.

5. A rasp, a pair of body sections, each section having a substantially cylindrical wall and a substantially frusto-conical wall, said cylindrical walls complementing each other to form the cylindrical cutting surface of the rasp body, said walls having holes therethrough, cutting elements inserted through said holes so as to protrude beyond said walls, lining means fitting over the inside of said cylindrical and frusto-conical walls so as to hold said cutting elements in cutting positions, and means to fasten said sections together over said lining means.

6. In a rasp, a pair of body sections, each section having a substantially cylindrical wall and a substantially frusto-conical wall, said cylindrical walls complementing each other to form the cylindrical cutting surface of the rasp body, said walls having holes therethrough, cutting elements inserted through said holes so as to protrude beyond said walls, a lining in each section fitting over the inner faces of said cylindrical and frusto-conical walls so as to hold said cutting elements in cutting positions, said linings backing each other when said sections are assembled, and means to fasten said sections together.

THOMAS P. BACON, JR.